(12) United States Patent
Stadler et al.

(10) Patent No.: US 10,121,344 B2
(45) Date of Patent: Nov. 6, 2018

(54) SMOKE DETECTION DEVICE, METHOD FOR DETECTING AT LEAST ONE SMOKE DETECTION FEATURE, AND COMPUTER PROGRAM

(71) Applicant: Robert Bosch GmbH, Stuttgart (DE)

(72) Inventors: Anton Stadler, Bernau (DE); Florian Kuhn, Seefeld (DE); Tjark Windisch, Zhuhai (CN)

(73) Assignee: Robert Bosch GmbH, Stuttgart (DE)

( * ) Notice: Subject to any disclaimer, the term of this patent is extended or adjusted under 35 U.S.C. 154(b) by 264 days.

(21) Appl. No.: 15/028,538

(22) PCT Filed: Sep. 30, 2014

(86) PCT No.: PCT/EP2014/070915
§ 371 (c)(1),
(2) Date: Apr. 11, 2016

(87) PCT Pub. No.: WO2015/052042
PCT Pub. Date: Apr. 16, 2015

(65) Prior Publication Data
US 2016/0253888 A1    Sep. 1, 2016

(30) Foreign Application Priority Data
Oct. 11, 2013   (DE) .................. 10 2013 220 553

(51) Int. Cl.
*H04N 7/18* (2006.01)
*G08B 17/12* (2006.01)
*G06K 9/00* (2006.01)

(52) U.S. Cl.
CPC ....... *G08B 17/125* (2013.01); *G06K 9/00771* (2013.01); *H04N 7/183* (2013.01)

(58) Field of Classification Search
CPC ... G06K 9/00771; G08B 17/125; H04N 7/183
See application file for complete search history.

(56) References Cited

U.S. PATENT DOCUMENTS

| | | | | |
|---|---|---|---|---|
| 2005/0069207 A1* | 3/2005 | Zakrzewski | ....... | B64D 45/0015 382/190 |
| 2008/0186191 A1* | 8/2008 | Shen-Kuen | ........ | G06K 9/00771 340/628 |

(Continued)

FOREIGN PATENT DOCUMENTS

| CN | 101248465 A | 8/2008 |
|---|---|---|
| CN | 101656012 A | 2/2010 |

(Continued)

OTHER PUBLICATIONS

International Search Report for Application No. PCT/EP2014/070915 dated Jan. 9, 2015 (English Translation, 3 pages).

*Primary Examiner* — Neil R Mikeska
(74) *Attorney, Agent, or Firm* — Michael Best & Friedrich LLP

(57) ABSTRACT

The invention relates to a smoke detection device 1, said smoke detection device 1 being connectable to at least one monitoring camera 2 which is designed to capture images of a monitored area, said monitored area comprising at least one stationary lighting object 3. The smoke detection device comprises an analyzing device 4, said analyzing device 4 being designed to detect at least one smoke detection feature in the monitored area in order to detect smoke in the images. The analyzing device 4 detects the at least one lighting object in the images, and the analyzing device 4 detects a change of a light scattering of the at least one detected lighting object 3 as the at least one smoke detection feature.

11 Claims, 4 Drawing Sheets

(56) References Cited

U.S. PATENT DOCUMENTS

| | | | |
|---|---|---|---|
| 2008/0246623 A1* | 10/2008 | Nagashima | G01N 21/21 340/630 |
| 2009/0256910 A1* | 10/2009 | Ganeshan | G08G 1/04 348/148 |
| 2012/0140231 A1* | 6/2012 | Knox | G01N 21/53 356/442 |

FOREIGN PATENT DOCUMENTS

| | | |
|---|---|---|
| EP | 1519314 | 3/2005 |
| WO | 0167415 | 9/2001 |
| WO | 2008037293 | 4/2008 |

* cited by examiner

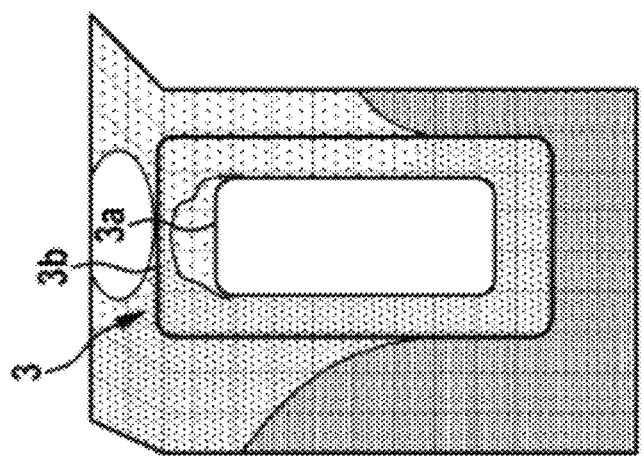
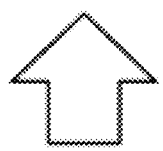
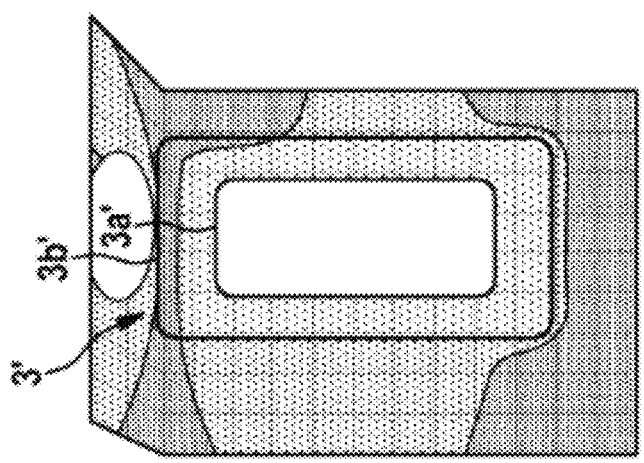
Fig. 3a
Fig. 3b

SMOKE DETECTION DEVICE, METHOD FOR DETECTING AT LEAST ONE SMOKE DETECTION FEATURE, AND COMPUTER PROGRAM

BACKGROUND OF THE INVENTION

The invention relates to a smoke detection device. The invention also relates to a method for detecting at least one smoke detection feature, and to a corresponding computer program.

Smoke detection devices serve to detect smoke and to trigger an alarm in the case of a detected fire. Specific characteristic variables, such as e.g. temperature or density of smoke particles, are measured for the detection of smoke. Owing to the availability of image sensors, smoke detection devices can also be operated with video cameras for detecting smoke.

In this regard, e.g. WO 2001 674 15 A1, which probably represents the closest prior art, describes an imaging fire alarm system that serves to detect a fire from a captured image sequence. Either a video camera or an infrared camera is used as an imaging device. Characteristic variables of a fire are evaluated either individually or in combination. For the captured image sequences, an object analysis, a structure analysis or a spatial frequency analysis is carried out in order to determine changes.

SUMMARY OF THE INVENTION

The invention thus proposes a smoke detection device. The smoke detection device is connectable or connected to at least one monitoring camera designed to capture images of a monitoring region. Optionally, the smoke detection device comprises the at least one monitoring camera. Particularly preferably, the monitoring camera is designed to capture images in the VIS range. The at least one monitoring camera can be embodied e.g. as a CCD camera or as a CMOS camera or in some other design. The monitoring region can be for example rooms or room sections in a building or else external regions in an environment.

The monitoring region comprises at least one stationary light object. In particular, the stationary light object is arranged fixedly in its positional location in the monitoring region. In particular, the light object generates and/or emits light rays. By way of example, the at least one stationary light object is a natural lighting device such as a window. However, it is particularly preferred for the at least one stationary light object to be embodied as an artificial lighting device. By way of example, the artificial lighting device is a lamp, a spotlight, a luminaire, an incandescent lamp, an LED and/or an LED lighting chain.

The smoke detection device comprises an evaluation device, wherein the evaluation device is suitable and/or designed to detect at least one smoke detection feature in the monitoring region for the purpose of smoke detection in the images transmittable or transmitted by the monitoring camera. The smoke detection feature is, in particular, an indicator of the presence of smoke in the monitoring region. For transmitting the images, the at least one monitoring camera is connectable or connected to the evaluation device data-technologically. The data transmission of the images is preferably carried out via a network. The network can be a wired network, such as e.g. a LAN, or a wireless network, such as e.g. a WLAN. However, it is also possible for the network or at least one segment of the transmission link in the network to be embodied as a public network, in particular an internet. By way of example, the evaluation device is embodied as a digital data processing device, in particular as a computer.

Optionally, the smoke detection device comprises a control device or is connectable thereto. The control device is designed, in particular, to actuate the issuing of an alarm indication, e.g. to a control center, in the event of smoke detection by the evaluation device. The control device can be embodied, e.g. jointly with the evaluation device, as a digital data processing device, in particular as a computer.

It is proposed within the scope of the invention that the evaluation device acquires the at least one light object in the images. The light object can be acquired manually, for example. By way of example, the light object is marked by a user on a screen on which the images of the monitoring region are represented. Alternatively or optionally supplementarily, the at least one light object can be acquired by means of an automatic detection of the light object in the images by the evaluation device. The automatic detection can optionally be verified by the user.

Furthermore, it is proposed that the evaluation device detects a change in the light scattering of the at least one acquired light object as the at least one smoke detection feature. Preferably, the evaluation device is designed for smoke detection in the monitoring region on the basis of the at least one detected smoke detection feature.

The smoke detection device according to the invention makes it possible to detect smoke in different environments in direct proximity to light objects. Since the light rays of the light object are changed when smoke is present, thus e.g. on account of a deflection at smoke particles, which is referred to in summary as scattering, the change in the light scattering forms a reliable indicator for smoke detection.

In one preferred implementation of the invention, the evaluation device acquires a light object region and a light scattering region as the acquired light object, wherein the evaluation device detects a change in the light scattering region as the change in the light scattering. By way of example, the light object region comprises the surface area and/or contour profile of the light object as acquired by the evaluation device. Preferably, the light scattering region is a region adjoining the light object region. In particular, the light scattering region is formed by a volume light scattering of the emitted light rays at smoke particles in the volume of the monitoring region between the light object and the monitoring camera. As a result of the optical projection of the monitoring camera in the direction of the light object, the light scattering region appears e.g. like a frame or a halo around the light object.

In one preferred embodiment, the evaluation device keeps available data concerning a reference light object having a reference light object region and/or a reference light scattering region without smoke particles. In particular, the reference light object region comprises the surface area and/or the contour profile of the reference light object. The reference light scattering region is a region adjoining the reference light object region. By way of example, the reference light scattering region is formed by a volume light scattering of the emitted light rays at dust particles. In general, the reference light scattering region corresponds, at least to a good approximation, to the surface area and/or the contour profile of the reference light object region. It is only in the ideal case that the reference light object has no reference light scattering region, as e.g. if no volume light scattering of the emitted light rays is present. The evaluation device compares the reference light object with the acquired light object in order to detect the change in the light scattering. By way of example, the evaluation device compares the reference light object region with the light object region and/or the reference light scattering region with the light scattering region.

In one possible implementation of the invention, the at least one smoke detection feature is a change in the contour profile of the acquired light object, which change is produced by the change in the light scattering, in particular of the light object region. When smoke is present, the light scattering is changed in particular in such a way that a changed contour profile is detected by the evaluation device. Preferably, the at least one smoke detection feature is detected by a comparison of the contour profile of the reference light object, in particular of the reference light object region, with the contour profile of the acquired light object, in particular of the light object region. By way of example, from the contour profiles of the reference light object and of the acquired light object, lengths, curvatures, edges and/or the positions thereof are compared with one another.

Since smoke generally always rises upward, it accumulates in particular below a ceiling, if present, of the monitoring region. Consequently, in the case where the stationary light object is arranged in proximity to the ceiling, in particular firstly the smoke accumulates in an upper region of the light object. Against this background, it is preferred for the contour profiles of the reference light object and of the acquired light object that proceed in the upper region to be compared with one another. As a result of the arrangement of the stationary light object in proximity to the ceiling, the light scattering is changed near to the time of smoke arising, as a result of the smoke intensity increasing first in proximity to the ceiling. In this way, a rapid and reliable detection of the smoke detection feature is implemented when smoke is present in the monitoring region.

In one preferred development, the contour profile of the reference light object has at least one corner region, wherein the evaluation device detects the at least one smoke detection feature as a rounding of the corner region of the acquired light object. By way of example, the reference light object is embodied in a rectangular fashion for forming the at least one corner region in the contour profile. As a result of the presence of smoke, the light scattering is changed in such a way that the at least one corner region is rounded and optionally enlarged. Particularly preferably, the corner region is arranged in the upper region with respect to the smoke rising direction, particularly preferably in the upper third of the reference light object. Consequently, the detection of the smoke detection feature on account of the smoke intensity increasing first in proximity to the ceiling is implemented rapidly and reliably.

One preferred embodiment provides for the at least one smoke detection feature to be an enlargement of the acquired light object, in particular of the light object region and/or of the light scattering region, that is produced by the change in the light scattering. Particularly preferably, the at least one smoke detection feature is detected by a comparison of the circumference and/or the area of the reference light object with the circumference and/or the area of the acquired light object.

In one preferred configuration of the invention, the at least one smoke detection feature is a brightening of the light scattering region of the acquired light object that is produced by the change in the light scattering. The at least one smoke detection feature is detected, in particular, by a comparison of the light scattering region of the acquired light object with the reference light scattering region of the reference light object. Particularly preferably, a light intensity of the light scattering region of the acquired light object for the purpose of detection as the smoke detection feature, in comparison with a light intensity of the reference light scattering region of the reference light object, has risen by at least five percent, in particular by at least ten percent, specifically by at least 15 percent. In particular, the light intensity is the maximum or average light intensity of the light scattering in the light scattering region or reference light scattering region.

In particular, smoke leads to a decrease in contrast, e.g. on account of the deflection of the emitted light rays at the smoke particles. Consequently, the acquired light object, in particular the light object region with respect to the light scattering region and/or the light scattering region with respect to the environment, when smoke is present, generally has a softer contrast in comparison with the reference light object. Against this background, it is preferred for the at least one smoke detection feature to be a change produced by the change in the light scattering, in particular the decrease in the contrast of the acquired light object. Preferably, the at least one smoke detection feature is detected by a comparison of the contrast of the reference light object with the contrast of the acquired light object.

In one possible configuration of the invention, the smoke detection device comprises a display device, wherein the display device is designed to display the images transmittable or transmitted by the monitoring camera. In particular, the display device is a screen. Preferably, the evaluation device communicates the detected smoke detection feature to the display device, wherein the display device is designed for the imaging display of the smoke detection feature in the images of the monitoring region. In this way, the image region having the detected smoke detection feature is indicated nearly instantaneously to the user who is responsible for alarm verification.

In one preferred embodiment, the acquired change in the light scattering is rejected as the smoke detection feature in the case where a predefined time limit value is undershot. The time-dependent evaluation helps to separate deceptive variables, such as e.g. persons moving past the light object, from actual smoke situations and thus leads to a reliable detection of the smoke detection feature.

Further subject matter of the invention relates to a method for detecting the at least one smoke detection feature using a smoke detection device, in particular a smoke detection device according to the preceding description. The evaluation device of the smoke detection device acquires the at least one light object in the images, wherein the evaluation device detects the change in the light scattering of the at least one acquired light object as the at least one smoke detection feature.

Further subject matter of the invention relates to a computer program comprising program code means having the features of claim 15.

BRIEF DESCRIPTION OF THE DRAWINGS

Further features, advantages and effects of the invention are evident from the following description of one preferred exemplary embodiment of the invention and the accompanying figures, in which:

FIGS. 3a, 3b show the detection of a second possible smoke detection feature by the evaluation device of the smoke detection device from FIG. 1;

DETAILED DESCRIPTION

Figure 1B:
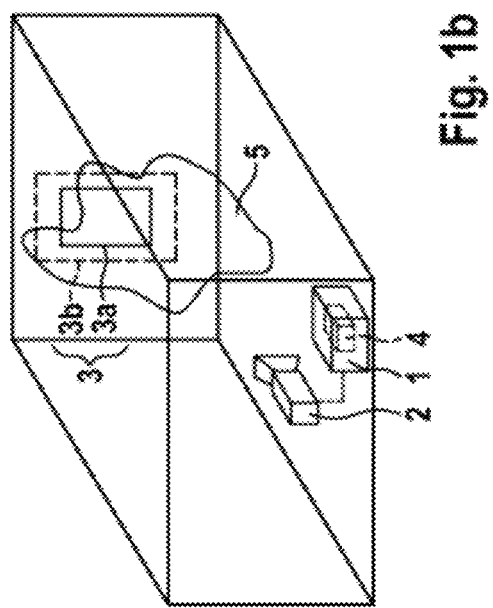
FIGS. 1*a*, 1*b* show a schematic illustration of a smoke detection device as one exemplary embodiment of the invention.
Figure 1A:
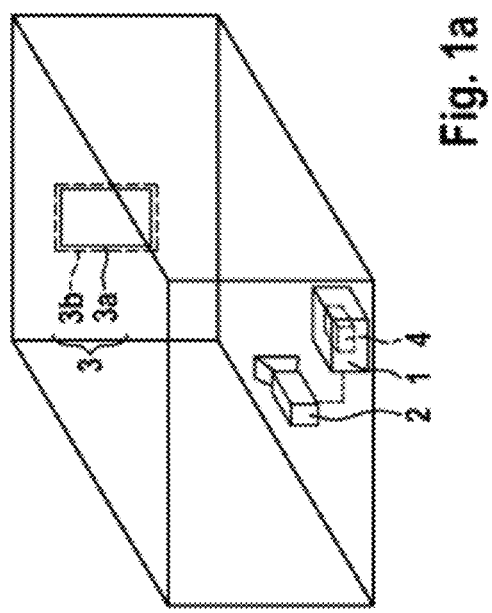

FIG. 1a shows a smoke detection device 1. The smoke detection device 1 is connected data-technologically to a monitoring camera 2 designed to capture images of a monitoring region. Optionally, the smoke detection device 1 comprises the monitoring camera 2. In this exemplary embodiment, the monitoring region captured by the monitoring camera 2 is at least one section of the schematically illustrated room. The monitoring region of the monitoring camera 2 comprises a stationary light object 3. The stationary light object 3 can be an artificial lighting device, such as e.g. a lamp.

The stationary light object 3 has a light object region 3a. The light object region 3a is formed by a contour profile and/or by a surface area of the contour profile of the light object 3. The stationary light object 3 has, e.g. on account of a volume light scattering at dust particles, a light scattering region 3b, which generally has a slightly larger contour profile and/or surface area in comparison with the light object region 3a.

FIG. 1b illustrates a cloud of smoke in the monitoring region, which leads at least partly to a volume scattering of the emitted light rays of the light object 3. The volume scattering at smoke particles has the effect that the light scattering region 3b is changed, e.g. enlarged, in comparison with the light scattering region 3b in FIG. 1a.

The smoke detection device 1 comprises an evaluation device 4 designed for smoke detection. For the purpose of smoke detection, the evaluation device 4 detects at least one smoke detection feature in the images of the monitoring camera 2. The smoke detection feature is an indicator of the presence of smoke in the monitoring region.

The evaluation device 4 is designed to acquire the at least one light object 3 having the light object region 3a and the light scattering region 3b in the images. Furthermore, the evaluation device 4 is designed to detect a change in a light scattering of the acquired light object 3 as the at least one smoke detection feature. For the acquisition of the light scattering, the light scattering of the light object 3 is acquired by the monitoring camera 2 e.g. at least partly as side light and/or as counterlight. Since, when smoke is present, a change in the light scattering results in particular owing to the volume light scattering at smoke particles or smoke aerosols, the light scattering of the light object 3 forms a reliable indicator for smoke detection.

For detecting the change in the light scattering, the evaluation device 4 keeps available at least one reference light object 3' having a reference light object region 3a' and/or a reference light scattering region 3b', wherein the reference light object 3' is compared with the acquired light object 3. The image with the reference light object 3' is captured in a smoke-free monitoring region in order to acquire the proper light scattering.

Optionally, the evaluation device 4 keeps available a plurality of reference light objects 3'. The latter are advantageous particularly if the light object 3 is embodied as a natural lighting device. Particularly the different light scattering conditions resulting therefrom, which can vary e.g. depending on the time of day, summer/wintertime or depending on fine/poor weather conditions, are taken into account by use of the different reference images.

Various smoke detection features which can result owing to the presence of smoke are explained by way of example in the following figures.

Figure 2A:
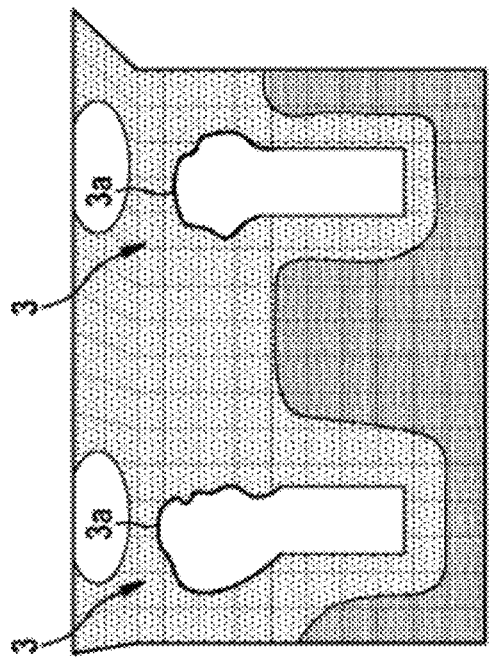
FIGS. 2a, 2b show the detection of a first possible smoke detection feature by an evaluation device of the smoke detection device from FIG. 1.
Figure 2B:
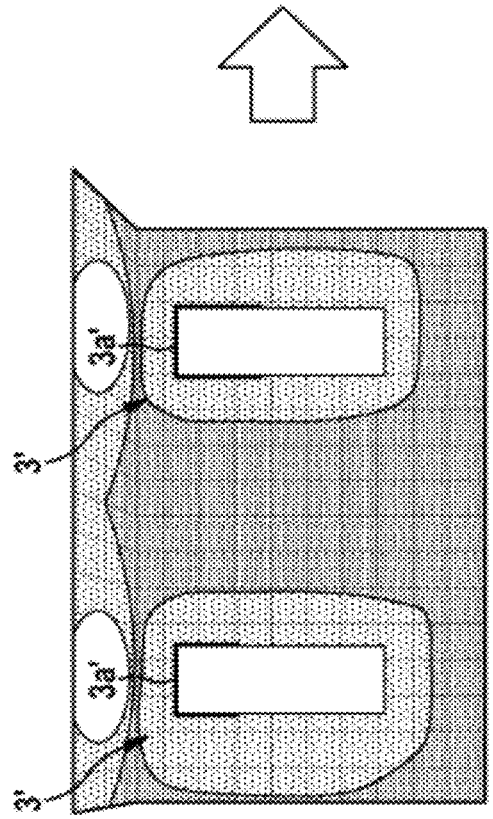

FIG. 2a shows the reference light object 3' having the reference light object region 3a' and FIG. 2b shows the acquired light object 3 having the light object region 3a. The smoke detection feature is illustrated in FIG. 2b and is a change in the contour profile of the light object region 3a of the acquired light object 3, which change is produced by the change in the light scattering. The upper section of the contour profile of the reference light object 3' is no longer discernible in FIG. 2b, but rather appears changed by the contour profile of the light object region 3a of the acquired light object 3. The smoke detection feature is detected by a comparison of the contour profile 3a' of the reference light object 3' with the contour profile 3a of the acquired light object 3.

In this exemplary embodiment, the contour profile 3a of the reference light object 3' has four corner regions, wherein two corner regions are arranged in an upper region of the reference light object 3' relative to the smoke rising direction. The smoke changes the light scattering in such a way that the upper two corner regions in FIG. 2b are rounded. The evaluation device 4 detects the smoke detection feature as roundings of the corner regions of the contour profile of the light object region 3a. Since the light object 3 is arranged in proximity to the ceiling in the monitoring region, an increase in the smoke intensity is present firstly at the upper corner regions of the light object 3. In this way, the smoke detection feature is detectable nearly instantaneously by the evaluation device 4.

As is readily discernible from FIGS. 2a and 2b, an enlargement of the light object region 3a is present regionally at the contour profile of the rounded corner regions. Therefore, it is possible for the smoke detection feature to be an enlargement of the light object region 3a of the acquired light object 3 that is produced by the change in the light scattering. The enlargement can be detected e.g. by a comparison of the circumference and/or the area of the reference light object region 3a' with the circumference and/or the area of the acquired light object region 3a.

FIG. 3a shows the reference light object 3' having the reference light object region 3a' and the reference light scattering region 3b' and FIG. 3b shows the acquired light object 3 having the light object region 3a and the light scattering region 3b. The smoke detection feature is illustrated in FIG. 3b and is a brightening of the light scattering region 3b of the acquired light object 3 that is produced by the change in the light scattering. The smoke detection feature is detected by a comparison of the reference light scattering region 3b' of the reference light object 3' with the light scattering region 3b of the acquired light object 3. For acquiring the brightening, e.g. an average and/or maximum light intensity of the light scattering region 3b has risen by ten percent in comparison with a light intensity of the reference light scattering region 3b.

Figure 4B:
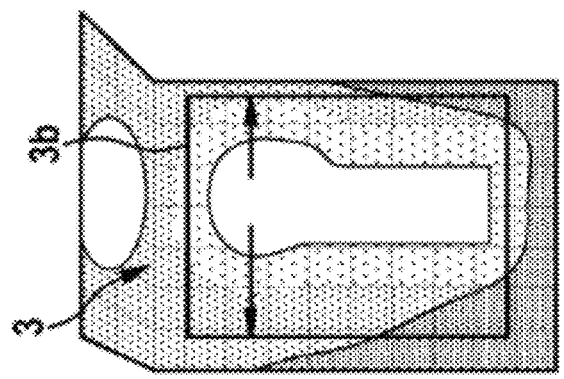
FIGS. 4a, 4b show the detection of a third possible smoke detection feature by the evaluation device of the smoke detection device from FIG. 1.
Figure 4A:
Figure 4A:
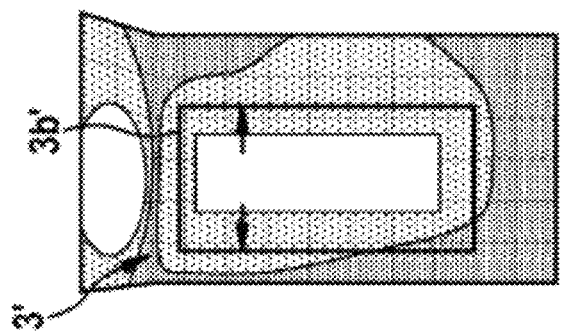

FIG. 4a shows the reference light object 3' having the reference light scattering region 3b' and FIG. 4b shows the acquired light object 3 having the light scattering region 3b. The smoke detection feature is illustrated in FIG. 4b and is an at least regional enlargement of the light scattering region 3b of the acquired light object 3 that is produced by the change in the light scattering. As is readily discernible from the gradient arrows, the light scattering region 3b is widened in comparison with the reference light scattering region 3b' of the reference light object 3'. The enlargement can be detected e.g. by a comparison of the circumference, the area and/or the gradient arrows of the reference light scattering region 3b' with the circumference, the area and/or with the gradient arrows of the acquired light scattering region 3b.

An alternative or optionally supplementary smoke detection feature in FIG. 4b is a change in a contrast of the acquired light object 3 that is produced by the change in the light scattering. The decrease in contrast of the light scattering region 3b of the acquired light object 3 with respect to the environment is illustrated in this exemplary embodiment. Smoke particles or smoke aerosols generally bring about a softer, lower-contrast transition from the light scattering region 3b to the environment. The smoke detection feature is detected e.g. by means of a comparison of the brightness profile, specifically by means of a comparison of the separation between a brightest and darkest pixel of the light scattering region 3b with that of the reference light scattering region 3b'.

The invention claimed is:

1. A smoke detection device comprising:
a connection configured to be connected to at least one monitoring camera, and
an evaluation device configured to
detect at least one smoke detection feature in a monitoring region for the purpose of smoke detection in images received from the at least one monitoring camera, wherein the at least one smoke detection feature is a change in a contour profile of the acquired light object detected by a comparison of a contour profile of a reference light object with the contour profile of the acquired light object, the contour profile of the reference light object having at least one corner region, wherein the evaluation device detects the at least one smoke detection feature as a rounding of the corner region of the acquired light object,
to acquire at least one light object in the images, and
to detect a change in a light scattering of the at least one acquired light object as the at least one smoke detection feature.

2. The smoke detection device as claimed in claim 1, wherein the evaluation device is configured to acquire a light object region and a light scattering region as the acquired light object, wherein the evaluation device detects a change in the light scattering region as the change in the light scattering.

3. The smoke detection device as claimed in claim 2, wherein the evaluation device is configured to keep available the reference light object having a reference light object region and/or a reference light scattering region, and to compare the reference light object with the acquired light object for the purpose of detecting the change in the light scattering.

4. The smoke detection device as claimed in claim 1, wherein the corner region is arranged in an upper region of the reference light object with respect to the smoke rising direction.

5. The smoke detection device as claimed in claim 1, wherein the at least one smoke detection feature further includes an enlargement of the acquired light object that is produced by the change in the light scattering.

6. The smoke detection device as claimed in claim 5, wherein the at least one smoke detection feature is detected by a comparison of the circumference and/or the area of the reference light object with the circumference and/or the area of the acquired light object.

7. The smoke detection device as claimed in claim 2, wherein the at least one smoke detection feature further includes a brightening of the light scattering region of the acquired light object that is produced by the change in the light scattering.

8. The smoke detection device as claimed in claim 1, wherein the at least one smoke detection feature further includes a change in a contrast of the acquired light object that is produced by the change in the light scattering.

9. The smoke detection device as claimed in claim 1 wherein the smoke detection device comprises a display device, wherein the display device is designed to display the images, wherein the evaluation device is configured to communicate the detected smoke detection feature to the display device, wherein the display device is designed for the imaging display of the smoke detection feature in the images of the monitoring region.

10. The smoke detection device as claimed in claim 1, wherein the acquired change in the light scattering is rejected as the smoke detection feature in the case where a predefined time limit value is undershot.

11. A method for detecting at least one smoke detection feature using a smoke detection device, in particular a smoke detection device as claimed in claim 1, wherein an evaluation device of the smoke detection device acquires at least one light object in images, wherein the evaluation device detects a change in a light scattering of the at least one acquired light object as the at least one smoke detection feature, wherein the at least one smoke detection feature is a change in a contour profile of the acquired light object detected by a comparison of a contour profile of a reference light object with the contour profile of the acquired light object, the contour profile of the reference light object having at least one corner region, wherein the evaluation device detects the at least one smoke detection feature as a rounding of the corner region of the acquired light object, which change is produced by the change in the light scattering.

* * * * *